United States Patent [19]
vanderSanden

[11] Patent Number: 5,711,971
[45] Date of Patent: Jan. 27, 1998

[54] RECONFIGURABLE MOLD HAVING TRAVELING EJECTOR SYSTEM

[75] Inventor: Louis vanderSanden, Hertogenbosch, Netherlands

[73] Assignee: The Whitaker Corporation, Wilmington, Del.

[21] Appl. No.: 650,405

[22] Filed: May 20, 1996

[51] Int. Cl.$^6$ ................................ B29C 45/40
[52] U.S. Cl. .................. 425/183; 425/185; 425/190; 425/556; 425/575
[58] Field of Search ............... 425/183, 185, 425/190, 556, 575

[56] References Cited

U.S. PATENT DOCUMENTS

| | | | |
|---|---|---|---|
| 3,091,809 | 6/1963 | Trueblood . | |
| 3,756,553 | 9/1973 | Ranz | 249/142 |
| 3,807,928 | 4/1974 | Horberg, Jr. et al. | 425/387 B |
| 3,871,611 | 3/1975 | Taketa | 249/102 |
| 3,898,030 | 8/1975 | Bishop | 425/183 |
| 4,303,221 | 12/1981 | Galluser et al. | 249/102 |
| 4,330,248 | 5/1982 | Platte | 425/183 |
| 4,379,685 | 4/1983 | Tada et al. | 425/183 |
| 4,416,604 | 11/1983 | Bender et al. | 425/183 |
| 4,439,123 | 3/1984 | Sano et al. | 425/183 |
| 4,501,548 | 2/1985 | Jahnel | 425/183 |
| 4,550,006 | 10/1985 | Laghi | 425/183 |
| 4,815,960 | 3/1989 | Rudolph | 425/522 |
| 4,861,534 | 8/1989 | Boehm et al. | 264/102 |
| 5,246,362 | 9/1993 | Kobayashi et al. | 425/183 |
| 5,255,889 | 10/1993 | Collette et al. | 249/102 |
| 5,282,733 | 2/1994 | Noritake et al. | 425/183 |
| 5,445,511 | 8/1995 | Ito et al. | 425/183 |
| 5,456,588 | 10/1995 | Yonekubo et al. | 425/183 |
| 5,560,939 | 10/1996 | Nakagawa et al. | 425/183 |

FOREIGN PATENT DOCUMENTS

| | | |
|---|---|---|
| 57-152908 A | 9/1982 | Japan . |
| 1-98234 A | 4/1989 | Japan . |
| 6015685 | 1/1994 | Japan . |
| 2 263 249 | 7/1993 | United Kingdom . |

*Primary Examiner*—James P. Mackey

[57] ABSTRACT

A reconfigurable injection mold machine (10) is disclosed having movable mold bodies (62, 62' and 64, 64') that can be automatically repositioned with respect to each other to mate different mold cavities for molding different parts. The machine includes a stationary A-side frame (14) having an A-side mold assembly (18) attached thereto and a movable B-side frame (16) having a B-side mold assembly (20) attached thereto. Each mold assembly includes a first mold body (60, 60') attached thereto and second and third mold bodies (62, 62' and 64, 64') that are coupled thereto and arranged for movement and repositioning with respect to the first mold body (60, 60'). The second and third movable mold bodies (62, 62' and 64, 64') include traveling ejector elements (136, 140, 190, and 210) that move along with the movable mold bodies and are operational in all operating positions of the mold bodies to eject molded parts.

8 Claims, 9 Drawing Sheets

Fig. 2

Fig. 3 (A-SIDE FRONT MOLD)

Fig. 4 (B-SIDE BACK MOLD)

RECONFIGURABLE MOLD HAVING TRAVELING EJECTOR SYSTEM

This application claims the benefit of U.S. Provisional application Ser. No. 60/003554 filed Aug. 25, 1995.

The present invention relates to injection molding apparatus for moldings parts wherein the apparatus is reconfigurable by moving one portion of the mold with respect to a fixed portion to mold one of several different parts, and more particularly, to such apparatus having ejector elements that travel along with the portion of the mold that moves.

BACKGROUND OF THE INVENTION

Molds for making injected molded parts are typically utilized in relatively high production environments where thousands of parts are molded in quick succession. These molds frequently are in continuous operation for days or weeks making the same part. When it is desirable to make a different part the mold is removed from the mold machine and replaced with a different mold. This, of course, means that the mold machine must be taken out of production while the molds are being changed. This usually does not cause an economic hardship because of the very large numbers of parts that are produced during the relatively long production cycle. The relatively short down time to change the molds is tolerable. However, when shorter production cycles are required because a smaller number of different parts is needed, the production down time needed for changing molds becomes more significant resulting in a greatly increased economic liability.

Reconfigurable molds are known that can be manipulated to mold different parts. These molds usually retire that the mold be disassemled and mold sections either be added or subtracted. This, of course, retires that the mold machine be taken out of production while the mold is reconfigured. An example of this the of reconfigurable mold is disclosed in U.S. Pat. No. 5,255,889 which issued Oct. 26, 1993 to Collette et al. The '889 patent discloses a blow mold for making a beverage bottle, having upper and lower mold sections that are joined by various intermediate sections that can be added or removed from the middle to mold the desired size bottle. While some of the same mold parts are common to all parts that are molded, the reconfiguring process consumes a significant amount of time resulting in slowed production. As with most mold machines, after shutdown of the machine to reconfigure the mold, the machine must be purged of old mold material. When the machine is again brought on line, the first several molded parts usually must be discarded until the process restabilizes. Another example of a reconfigurable mold is disclose in U.S. Pat. No. 4,861,534 which issued Aug. 29, 1989 to Boehm et al. This mold is for molding circuit boards and utilizes a single mold cavity with an array of core pins that are selectively retractable from the cavity. By allowing only the core pins that are required to produce the desired hole pattern in the circuit board to remain in the mold cavity and retracting all others, any desired hole pattern may be produced in the circuit board. However, when a circuit board of different size is required, the mold must be changed.

Reconfigurable molds having movable mold bodies that can be automatically positioned to mold a particular part will require substantially no down time and will overcome many of the detriments of the prior art reconfigurable molds, as set forth above. However, when ejector elements are required to eject the molded part from the mold, such as when molding small complex electrical connector housings, it is difficult to provide the needed ejectors in the movable mold bodies.

What is needed is a reconfigurable mold having movable mold bodies that can be easily and automatically repositioned to make relatively small quantities of different parts while providing part ejectors that are operable in all molding positions of the movable mold bodies.

SUMMARY OF THE INVENTION

Apparatus is disclosed for selectively molding one of a plurality of different molded parts. The apparatus includes a mold frame having an A-side frame and a B-side frame coupled thereto. First and second mold bodies are provided, the first mold body having a first mold cavity therein and the second mold body having a second and a third mold cavities therein. One of the first and second mold bodies is selectably movable with respect to the other to a first position where the second mold cavity is in communication with the first mold cavity and to a second position where the third mold cavity is in communication with the first mold cavity. Both the first and second mold bodies are split along a part line so that each has a portion on one side of the part line coupled to the A-side frame and another portion on the other side of the part line coupled to the. B-side frame. One of the A-side frame and B-side frame are arranged to move in a direction toward the part line into a closed position wherein respective portions of the first and second mold bodies are in mutual mated engagement, and in an opposite direction away from the part line to an open position wherein the respective portions are separated. The apparatus includes a first actuator for effecting the movement of the movable mold body and a second actuator for effecting the movement of the movable A- or B-side frame. A traveling ejector is arranged in the B-side portion of the movable mold body and operable to eject the molded part when the A- or B-side frame has moved to the open position. The traveling ejector is operable when the movable mold body is in both the first and second positions. A third actuator is provided for effecting the operation of the traveling ejector.

DESCRIPTION OF THE FIGURES

FIG. 3 is a cross-sectional view taken along the lines 3—3 in FIG. 1;

FIG. 9 is a cross-sectional view taken along the lines 9—9 in FIG. 6; and

DESCRIPTION OF THE PREFERRED EMBODIMENT

Figure 1:
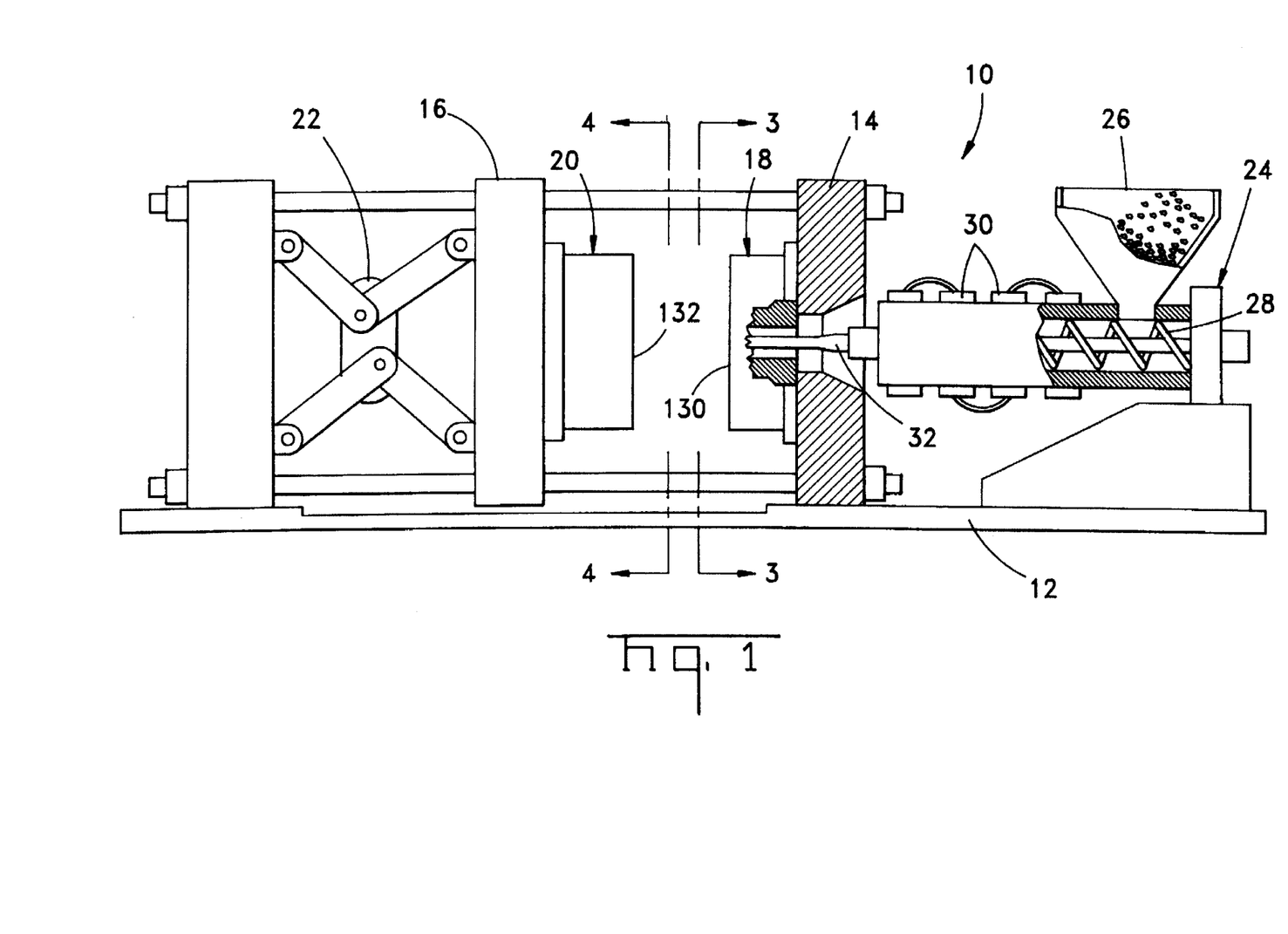
FIG. 1 is a front view of a mold machine incorporating the teachings of the present invention.
Figure 2:
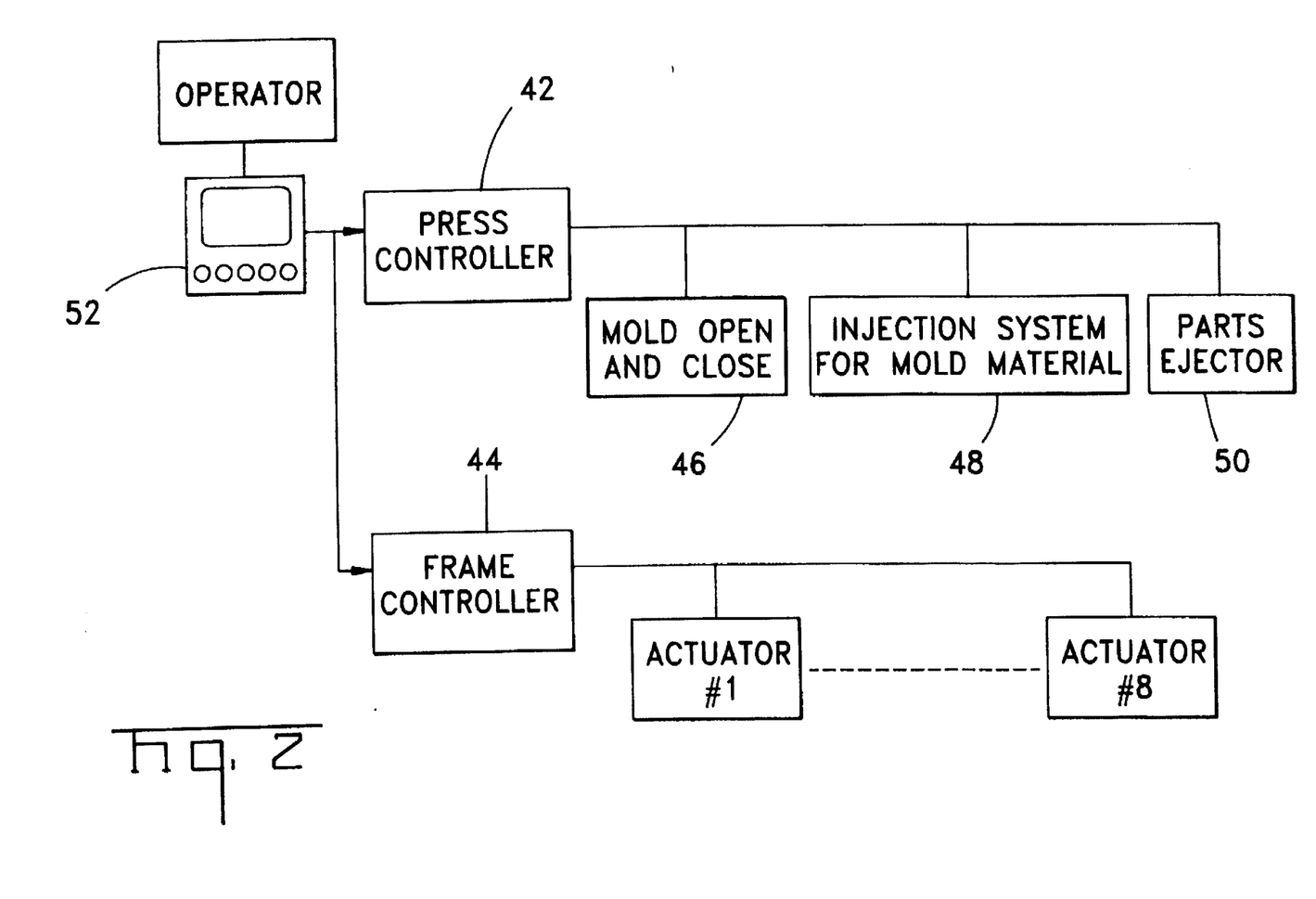
FIG. 2 is a block diagram showing control functions of the machine shown in FIG. 1.

There is shown in FIG. 1 a mold machine 10 having a machine frame 12, an A-side frame 14 fixed to the machine frame, and a B-side frame 16 that is coupled to the machine frame so that it can move toward and away from the A-side frame. An A-side mold assembly 18 is attached to the A-side frame 14 and a mating B-side mold assembly 20 is attached to the B-side frame, in the usual manner. The B-side frame 16 is moved by means of a toggle clamp 22 that is hydraulic or electrical powered. A mold material injection system 24 is attached to the machine frame 12 and arranged to inject mold material into the mold cavities in the mated A-side and B-side mold assemblies, as will be explained below. The injection system 24 includes a hopper 26 for holding plastic pellets, a rotating screw 28 for feeding the pellets and the molten plastic, heater bands 30 for heating the plastic to a molten state, and a nozzle 32 that directs the molten plastic directly into the A-side mold assembly 18. A block diagram is shown in FIG. 2 showing the control functions of the mold machine 10. A press controller 42 and a frame controller 44 are interconnected to the machine 10. The press controller 42 controls various standard press functions such as opening and closing the mold, commanding the mold material injection system, and ejection of the finished molded parts, indicated in FIG. 2 as 46, 48, and 50, respectively. The frame controller 44 is interconnected to both the A-side and B-side mold assemblies 18 and 20, respectively, and controls movement of the movable mold bodies when reconfiguring the mold, as will be explained below. An input/output terminal 52 is optionally interconnected with the press and frame controllers 42 and 44 so that an operator can manually enter mold configuration commands.

Figure 5:
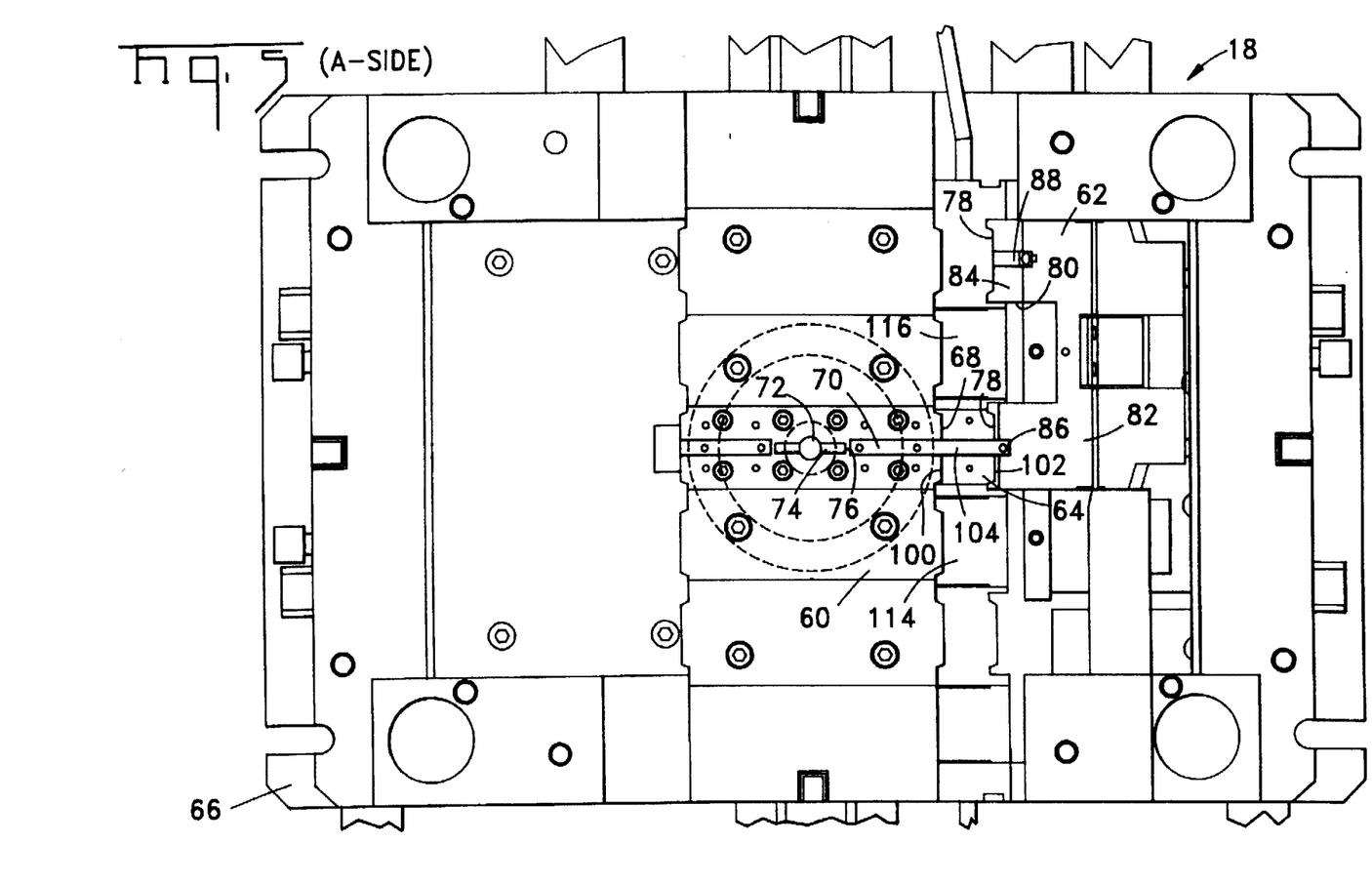
FIG. 5 is an enlarged view of a portion of that of FIG. 3.
Figure 6:
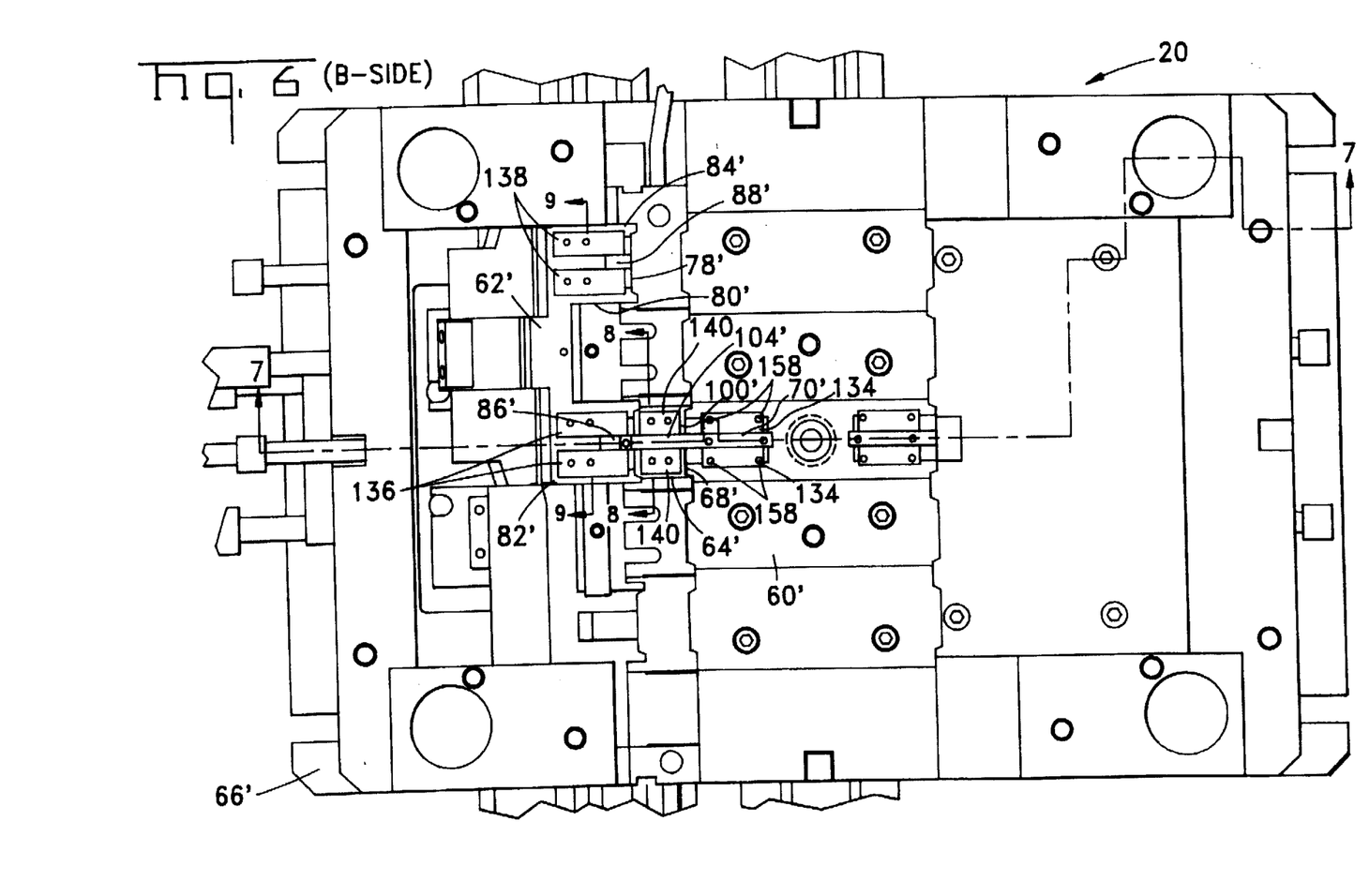
FIG. 6 is an enlarged view of a portion of that of FIG. 4.

The A-side mold assembly 18, as shown in FIGS. 3 and 5, includes first, second, and third mold bodies 60, 62, and 64, respectively. The first mold body 60 is rigidly attached to a platen 66 that serves as a base for the A-side mold assembly 18. The second and third mold bodies 62 and 64 are slidingly coupled to the platen 66, as will be explained. As best seen in FIG. 5, the first mold body 60 includes a first surface 68 and a first mold cavity 70 that intersects the surface 68. The nozzle 32 enters the center of the first mold body and terminates in a sprue 72 which is in communication with the mold cavity 70 by means of a runner 74 and tunnel gate 76, in the usual manner.

The second mold body 62 includes a second surface 78 that is parallel to the first surface 68 and opposed thereto, as shown in FIG. 5. A cutout 80 is formed in the second surface 78 thereby forming two legs 82 and 84. The leg 82 includes a second mold cavity 86 and the leg 84 includes a third mold cavity 88, each of which intersects the second surface 78. The second mold body 62 is slidingly coupled to the platen 66 by any suitable means so that it is free to move both horizontally and vertically, as viewed in FIGS. 3 and 5. A first linear actuator 90, which in the present example is an air cylinder, is attached to the platen 66 and is slidingly coupled to the second mold body 62 so that upon operation of the actuator 90, the second mold body is made to move in either direction along a horizontal path, as viewed in FIG. 3. A pair of opposing second and third linear actuators 92 and 94, which are air cylinders in the present example, are secured to mounting brackets 96 and 98 that are attached to the platen 66. The piston rods of the two actuators 92 and 94 are coupled to opposite sides of the second mold body 62 through two slide bars 61 and 63 which abut against the second mold body 62 so that the second mold body can be made to move in either direction along a vertical path, as viewed in FIG. 3.

The third mold body 64 includes third and fourth parallel surfaces 100 and 102, respectively. A fourth mold cavity 104 extends through the third mold body 64 intersecting the two surfaces 100 and 102. The third mold body 64 is slidingly coupled to the platen 66 by any suitable means so that it is free to move both horizontally and vertically, as viewed in FIGS. 3 and Fourth and fifth linear actuators 106 and 108, which in the present example are air cylinders, are attached to the platen 66 and are coupled through a pivoting linkage, not shown, to the third mold body 64 so that upon operation of the actuators, the third mold body 64 is made to move toward the right, as viewed in FIG. 3, toward the first actuator 90. A pair of opposing sixth and seventh linear actuators 110 and 112, which are air cylinders in the present example, are secured to mounting brackets 96 and 98. The piston rods of the two actuators 110 and 112 are slidingly coupled to opposite sides of the third mold body 64 so that by varying the relative pressure in the two actuators, the third mold body can be made to move in either direction along a vertical path, as viewed in FIG. 3, and parallel to the first surface 68. The third mold body 64 includes two opening 114 and 116 that extend completely through the body 64 intersecting the third and fourth surfaces 100 and 102, for a purpose that will be explained.

Figure 4:
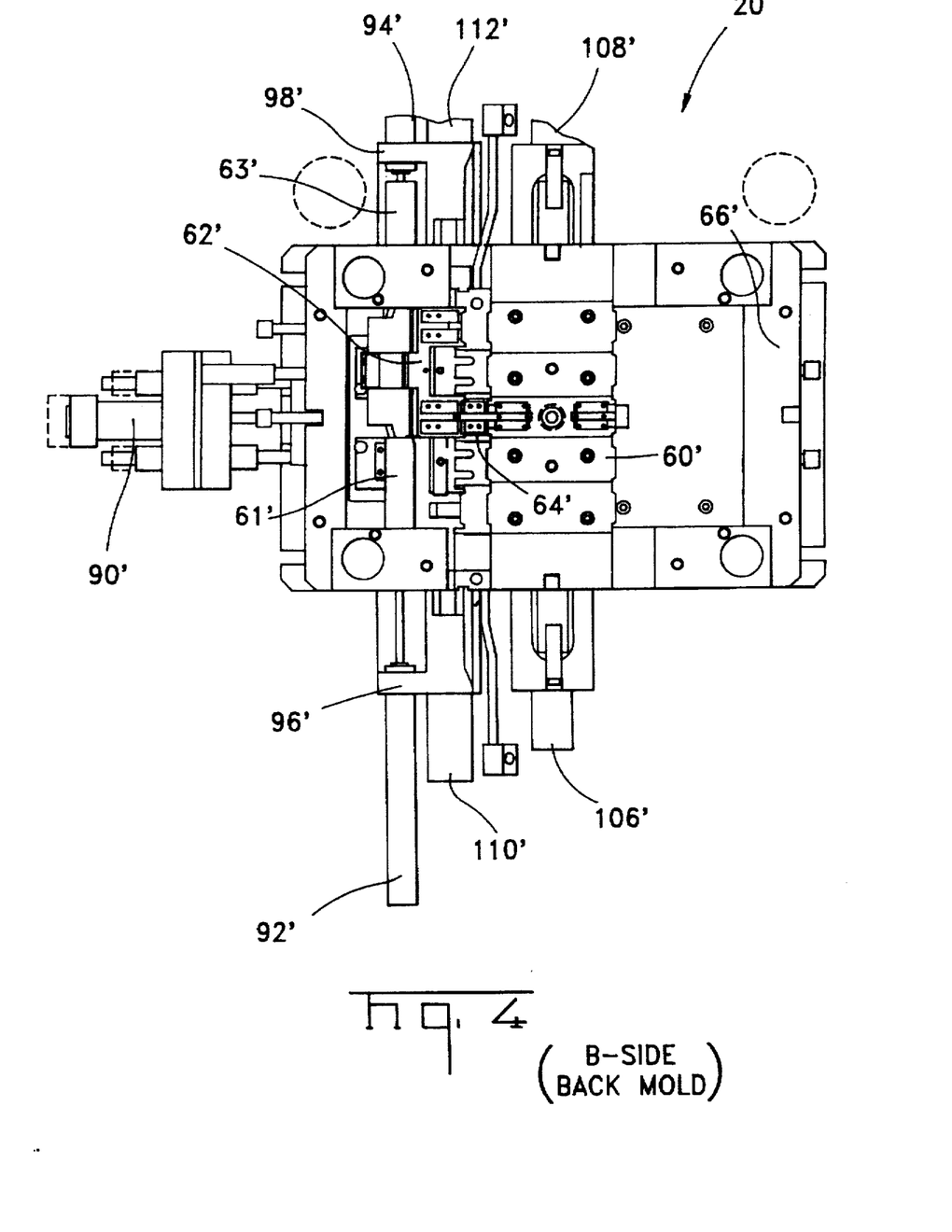
FIG. 4 is a cross-sectional view taken along the lines 4—4 in FIG. 1.
Figure 7:
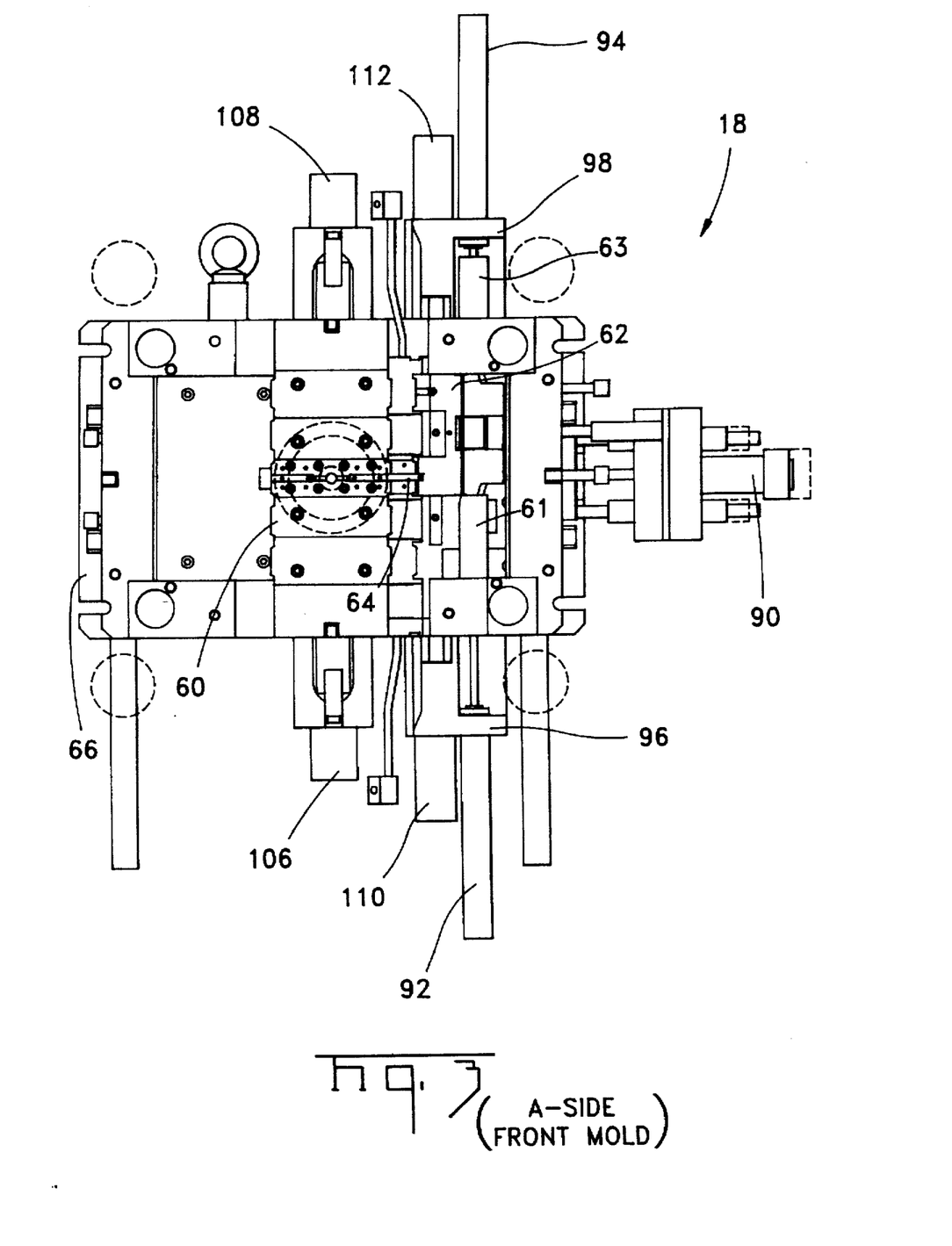
FIG. 7 is a cross-sectional view taken along the lines 7—7 in FIG. 6.

The B-side mold assembly 20, as viewed in FIGS. 4 and 7, have first, second, and third mold bodies that mate with the first, second, and third mold bodies 60, 61, and 62 of the A-side assembly 18, and have similar identifying part numbers Chat are primed. That is, the first, second and third mold bodies of the B-side are identified by the part numbers 60', 62', and 64', respectively. Additionally, other features of the B-side mold assembly that have substantially similar corresponding features on the A-side will be identified with a primed version of the A-side part number, even though the corresponding features may be somewhat different. The second and third mold bodies 62' and 64' are arranged to move both horizontally and vertically, as viewed in FIG. 4, in a manner similar to the mold bodies 62 and 64, by means of first, second, third, fourth, fifth, sixth, and seventh actuators 90', 92', 94', 106', 108', 110', and 112', respectively. The outer surfaces of the A-side mold bodies 60, 62, and 64, are mutually coplanar and are collectively identified by the number 130 in FIG. 1, this collective surface being the parting line of the mold. The opposing surfaces of the B-side mold bodies 60', 62', and 64' are also mutually coplanar and parallel with the surface 130 and are collectively identified by the number 132 in FIG. 1. The collective surfaces 130 and 132 are in sealing mated engagement during the actual molding process, as will be explained.

The B-side mold assembly 20 includes a traveling ejector element system for ejecting the molded part that is functional when the second and third mold bodies are in any of their four operative positions. These four operative positions are schematically shown in FIGS. 10 through 13 and will be described below. The ejector system, as shown in FIGS. 6, 7, 8, and 9, includes a first pair of opposing ejector rails 134 coupled to the first mold body 60', two second pairs of opposed ejector rails 136 and 138 coupled to the two legs 82' and 84', respectively, of the second mold body 62', and a third pair of opposed ejector rails 140 coupled to the third mold body 64'. The ejector rails 134, 136, 138, and 140, are actuated by means of an actuating mechanism that is best seen in FIG. 7. As shown in FIG. 7, the B-side mold assembly includes three stacked plates 142, 144, and 146, that are secured to the platen 66'. The plate 146 includes an elongated opening 148 containing a pair of pusher plates 150 and 152 that are secured together by means of eight screws 154 that are threaded into holes in the plate 152. A pair of mutually parallel T-slots 156 are formed in the undersurface of the plate 152 in vertical alignment with the two ejector rails 134. A pair of ejector rail pins 158 having enlarged heads 160 are disposed in each of the T-slots, the pins extending upwardly through holes in the plate 146 and aligned holes in the first mold body 60', terminating in threaded holes in the ejector rails. The enlarged heads 160 hold the ejector rail pins captive within the T-slots. The opening 148 is deep enough in the plate 146 so that a space 160 exists above the top surface of the pusher plate 152. The two pusher plates 150 and 152 are arranged to move vertically within this space 160. As the pusher plates move upwardly, as viewed in FIG. 7, the four ejector rail pins 158 are moved axially upwardly thereby moving the attached ejector rails upwardly as well. When the pusher plates are moved downwardly to the position shown in FIG. 7, the ejector rails 134 are pulled downwardly too because the ejector rail pins 158 are held captive within the T-slots 156. The two pusher plates 150 and 152 are moved vertically by means of a power linear actuactor (62) a hydraulic cylinder in the present cases, which is attached to the B-side frame 16. The cylinder 162 includes a piston rod 164 that is coupled to a drive plate 166 by means of a pin 168. The drive plate 166 is disposed within an opening 170 in the plate 142 arranged in vertical alignment with the center of the pusher plates 150 and 152, as shown in FIG. 7. Four push rods 172 are attached to the upper surface 174 of the drive plate 166 by means of screws 176 that are threaded into the ends of the push rods. The push rods are accurately located by means of a locating plate 178 that is attached to the drive plate 166 by means of screws 180, the push rods extending upwardly, as viewed in FIG. 7, through holes in the two plates 144 and 146 and the lower pusher plate 150. The ends of the push rods have reduced diameters 182 that are threaded into holes in the upper pusher plate 152 so that their shoulders 184 are secured tightly against the lower surface of the upper pusher plate. When the piston rod 164 of the hydraulic cylinder 162 is extended, the drive plate 166 is moved upwardly in the opening 170, as viewed in FIG. 7, so that the push rods 172 move the pusher plates 150 and 152 upwardly thereby moving the ejector rail pins 158 and attached ejector rails 134 upwardly to eject the molded part from the first mold cavity 70'.

Figure 8:
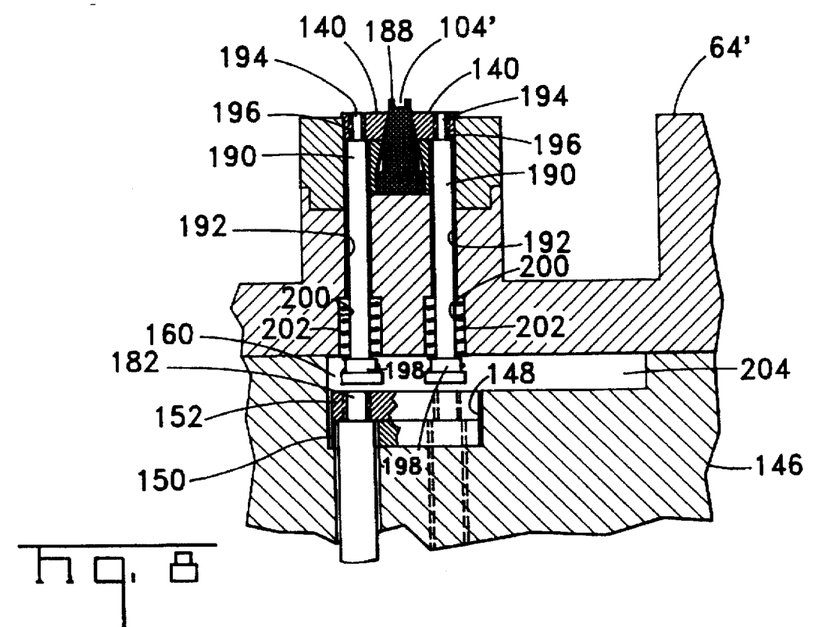
FIG. 8 is a cross-sectional view taken along the lines 8—8 in FIG. 6.

Since the second and third mold bodies 62' and 64' are movable with respect to the first mold body 60' to different operating positions, ejector rail pins similar to the ejector rail pins 158 are not suitable for operating the ejector rails 136, 138, and 140. In this case, traveling ejector rail pins are needed. As best seen in FIG. 8, the two ejector rails 140 straddle the fourth mold cavity 104' of the third mold body 64'. Note that the mold cavity 104' contains mold cores 188 in the usual manner. Two pair of traveling ejector rail pins 190 extend vertically through holes 192 formed in the third mold body 64' and include reduced diameters 194 that are threaded into holes in the ejector rails 140 so that their shoulders 196 are secured tightly against the under surfaces of the ejector rails. There are two ejector rail pins 190 attached to each ejector rail 140. Each ejector pin 190 includes an enlarged head 198 that extends into the space 160 vertically above the pusher plate 152, as shown in FIG. 8. The holes 192 include counterbores 200 containing compression springs 202 that push against the enlarged heads 198 thereby urging the traveling ejector rail pins downwardly, as viewed in FIG. 8, toward the pusher plate 152. As the pusher plate 152 is moved upwardly by the hydraulic cylinder 162 to actuate the ejector rails 140, the pusher plate engages the enlarged heads 198 and pushes the ejector rail pins and attached ejector rails 140 upwardly against the resistance of the springs 202, thereby ejecting the molded part from the mold cavity 104'. The plate 146 includes a space 204 that is a lateral extension of the space 160 and is clearance for the heads 198 when the third mold body 64' is moved toward the right, as viewed in FIG. 8, to its other operating position as will be described below. When the third mold body is in this position, the pusher plate 152 may be actuated without engaging the heads 198.

As shown in FIG. 9, the two ejector rails 136 straddle the second mold cavity 86' of the second mold body 62'. Note that the mold cavity 86' contains mold cores 188 in the usual manner. Similarly, the two ejector rails 138 straddle the third mold cavity 88'. Two pair of traveling ejector rail pins 210 extend vertically through holes 212 formed in the leg 82' of the second mold body 62' and include reduced diameters 214 that are threaded into holes in the ejector rails 136 so that their shoulders 216 are secured tightly against the under surfaces of the ejector rails. There are two ejector rail pins 210 attached to each ejector rail 140. Each ejector pin 210 includes an enlarged head 218 that extends into the space 160 vertically above the pusher plate 152, as shown in FIG. 9. The holes 212 include counterbores 220 containing compression springs 222 that push against the enlarged heads 218 thereby urging the traveling ejector rail pins downwardly, as viewed in FIG. 9, toward the pusher plate 152. As the pusher plate 152 is moved upwardly by the hydraulic cylinder 162 to actuate the ejector rails 134, the pusher plate engages the enlarged heads 218 and pushes the ejector rail pins and attached ejector rails 136 upwardly against the resistance of the springs 222, thereby ejecting the molded part from the mold cavity 86'. When the piston rod 164 is retracted, the springs 222 return the ejector rails 136 to their positions shown in FIG. 9. Similarly, the leg 84' of the second mold body 62' includes two pair of ejector rail pins 210 disposed in counterbored holes 212, the pins having reduced diameters 214 in threaded engagement with holes in the ejector rails 138, two pins being attached to each rail. The reduced diameters 214 are threaded into the ejector rails 138 so that their shoulders 216 are secured tightly against the under surfaces of the ejector rails. The pins 210 include enlarged heads 218 that extend into a space 224 that is a lateral extension of the space 160 and is clearance for the heads 218 when the leg 84' of the second mold body 62' is in the position shown in FIG. 9. When moving the second mold body 62' to its other operating position, as will be described below, the body 62' is moved toward the left, as viewed in FIG. 9, until the leg 82' is moved out of position and the leg 84' occupies the position formerly occupied by the leg 82'. In this position, upon extension of the piston rod 164, the pusher plate 152 clears the heads 218 coupled to the leg 82' but engages the heads 218 coupled to the leg 84' so that the ejector rails 138 are extended to eject a molded part in the third mold cavity 88'.

During operation of the machine 10, the toggle clamp 22, shown in FIG. 1, extends the B-side frame 16 toward the A-side frame 14 until the collective surfaces 132 sealingly engage the collective surfaces 130 with the mold cavities 70, 86, 88, and 104 in mutual mated engagement with respective mold cavities 70', 86', 88', and 104'. The mold machine 10 is capable of molding parts in four different configurations by rearranging the second and third mold bodies 62, 62', 64, and 64' by means of the fourteen actuators 90, 90', 92, 92', 94, 94', 106, 106', 108, 108', 110, 110', 112 and 112'. This rearranging of the mold bodies is referred to herein as reconfiguring the mold, and will now be described with reference to FIGS. 10 through 13, which schematically illustrate the various operating positions of the second and third mold bodies for the A-side and B-side mold assemblies. The views in these figures are shown from the perspective of the B-side as viewed in FIG. 6 and, therefore, will be described in terms of the B-side only. It will be understood however that when a B-side actuator or mold body is referenced, the corresponding A-side actuator or mold body is also included so that the two should be considered as operating in pairs. That is, when the first actuator 90' of the B-side is operated, the first actuator 90 of the A-side is operated concurrently therewith.

Figure 10:
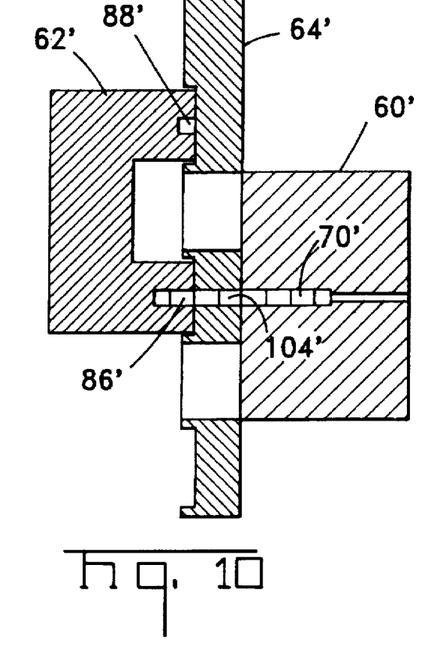
FIGS. 10 through 13 are schematic representations of the three mold bodies of FIG. 6 shown in various operating positions.
Figure 11:
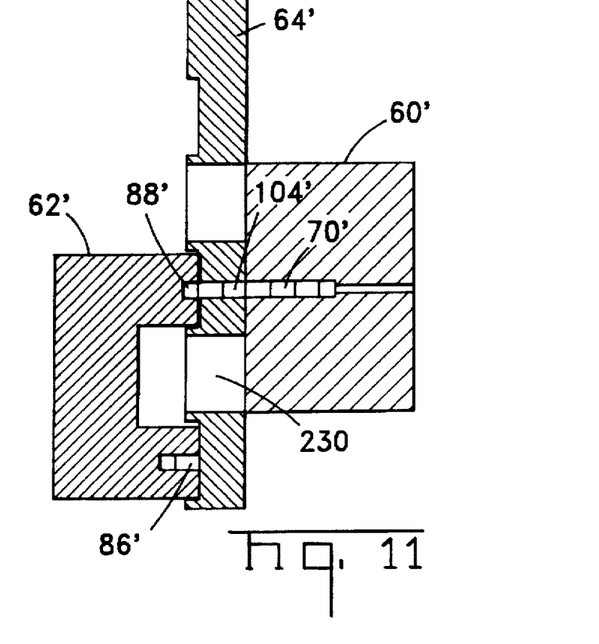
Figure 12:
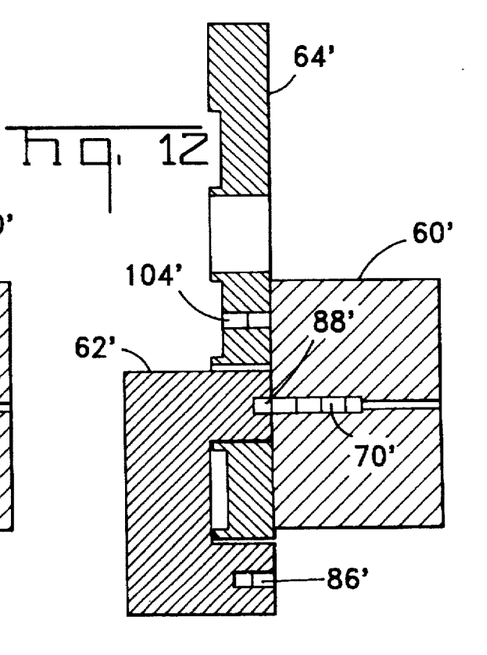
Figure 13:
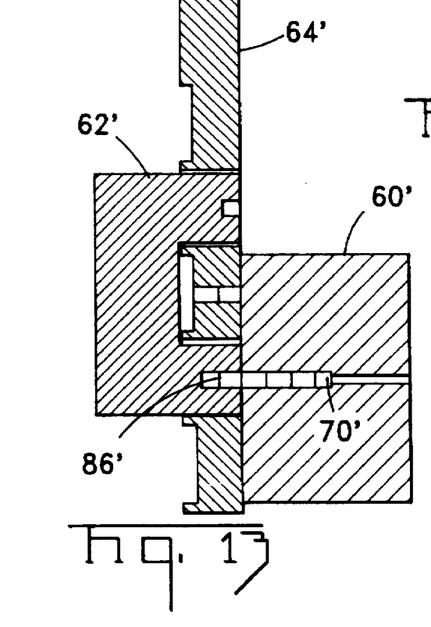

As shown in FIG. 10 the mold cavities 70', 104', and 86' are in mated engagement for molding a first part by operating the injection system 24. When it is desired to mold a second part utilizing the mold cavities 70', 104', and 88', the second mold body must be moved to the position shown in FIG. 11. This is done by first opening the mold by operating the toggle clamp 22 and then operating the first actuator 90' to move the second mold body 62' away from the third mold body 64'. The second and third actuators 92' and 94' are operated to move the second mold body 62' downwardly, as viewed in FIG. 11, so that the mold cavity 88' is in proper alignment with the mold cavity 104'. The first actuator 90' is then operated to move the second mold body 62' into mated engagement with the third mold body 64'. The toggle clamp 22 is then operated to close the mold and the injection system 24 operated to inject molten plastic into the mated mold cavities. When it is desired to mold a third part utilizing the mold cavities 70' and 88' the second and third mold bodies 62' and 64' must be moved to the position shown in FIG. 12. This is done by first opening the mold by operating the toggle clamp 22 and then operating the first actuator 90' to move the second mold body 62' away from the third mold body 64'. The fourth and fifth actuators 106' and 108' are operated to move the third mold body 64' to the left, as viewed in FIG. 11, out of engagement with the first mold body 60' and then the sixth and seventh actuators 110' and 112' are operated to move the third mold body upwardly so the opening 230, shown in FIG. 11, is in centered alignment with first mold cavity 70'. The first actuator 90' is then operated to move the third mold body 64 to the right, as viewed in FIG. 12, and the second mold body 62' into mated engagement with the first mold body 60', to the position shown in FIG. 12, with the mold cavities 70' and 88' in mated engagement. When it is desired to mold a fourth part utilizing the mold cavities 70' and 86', the second mold body 62' must be moved to the position shown in FIG. 13. This is done by first opening the mold by operating the toggle clamp 22 and then operating the first actuator 90' to move the second mold body 62' away from the third mold body 64'. The second and third actuators 92' and 94' are then operated to move the second mold body 62' upwardly, as viewed in FIG. 12 until the second mold cavity 86' is in alignment with the first mold cavity 70'. The first actuator 90' is then operated to move the second mold body 62' into mated engagement with the first mold body 60', to the position shown in FIG. 13, with the mold cavities 70' and 86' in mated engagement for molding a fourth part.

An important advantage of the present invention is that small complex parts, such as electrical connector housings, can be molded in a reconfigurable mold where ejector elements are required to remove the molded part. The present ejector elements are arranged in the movable mold bodies and travel therewith during reconfiguration so that they are operable in all operating positions of the movable mold bodies. The present traveling ejector elements are relatively simple in structure and permit rapid and automated reconfiguration of the mold. This is very beneficial when making relatively small quantities of different parts because machine down time is essentially eliminated.

I claim:
1. Apparatus for selectively molding one of a plurality of different molded parts, comprising:
   (a) a mold frame, an A-side frame coupled to said mold frame, and a B-side frame coupled to said mold frame;
   (b) a first mold body having a first mold cavity therein, and a second mold body having a second mold cavity and a third mold cavity therein,
      one of said first and second mold bodies being selectably movable with respect to the other to a first position where said second mold cavity is in communication with said first mold cavity and to a second position where said third mold cavity is in communication with said first mold cavity, and
      both said first and second mold bodies being split along a part line so that each has a portion on one side of said part line coupled to said A-side frame and another portion on the other side of said part line coupled to said B-side frame, one of said A-side frame and B-side frame arranged to move in a direction toward said part line into a closed position wherein respective portions of said first and second mold bodies are in mutual mated engagement, and in an opposite direction away from said part line to an open position wherein said respective portions are separated;
   (c) a first actuator for effecting said movement of said movable mold body and a second actuator for effecting said movement of said one of said A-side frame B-side frame;
   (d) a traveling ejector arranged in said portion of said movable mold body coupled to said B-side frame and operable to eject said molded part only when said one of said A-side frame and B-side frame has moved to said open position, said traveling ejector operable when said movable mold body is in both said first and second positions; and
   (e) a powered linear actuator for effecting said operation of said traveling ejector.

2. The molding apparatus according to claim 1 wherein said traveling ejector includes an ejector member arranged to slide within an opening in said movable mold body in a direction toward and away from said A-side, said ejector member having an ejector edge for engaging and ejecting said molded part when said traveling ejector is operated by said third actuator.

3. The molding apparatus according to claim 2 wherein said ejector member is a cylindrically shaped pin and said traveling ejector includes a resilient member arranged to urge said ejector member to slide within said opening in said direction away from said A-side.

4. The molding apparatus according to claim 3 wherein said movable mold body is said second mold body and said portion of said movable mold body coupled to said A-side frame and said portion of said movable mold body coupled to said B-side frame thereof are slidingly coupled to said A-side and B-side frames, respectively, for guiding said selective movement to said first and second positions.

5. The molding apparatus according to claim 4 wherein said third actuator includes a plate coupled to said B-side frame for movement toward and away from said part line, said plate having a substantially flat abutting surface that is parallel to said part line and in alignment with said ejector member so that upon said operation of said traveling ejector said plate is caused to move toward said part line, said abutting surface engaging and moving said ejector member toward said A-side frame into ejecting engagement with said molded part.

6. The molding apparatus according to claim 5 wherein said linear actuator includes a hydraulic cylinder coupled between said B-side frame and said plate.

7. The molding apparatus according to claim 6 wherein said ejector edge is an edge of an elongated member attached to said ejector member and arranged so that substantially the full length of said ejector edge engages an edge of said molded part during said ejection thereof.

8. The molding apparatus according to claim 7 including another ejector edge of an elongated member attached to said ejector member, said another ejector edge arranged opposite said ejector edge for engaging another edge of said molded part during said ejection thereof.

* * * * *